April 28, 1970 P. M. LEMOIGNE 3,508,726

MEMBERS SUBJECTED TO AN AIRFLOW

Filed Nov. 13, 1967 5 Sheets-Sheet 1

Inventor
Pierre Marcel Lemoigne
By Abbott, Downing & Seebold
Attorneys

MEMBERS SUBJECTED TO AN AIRFLOW

Filed Nov. 13, 1967 5 Sheets-Sheet 2

April 28, 1970 P. M. LEMOIGNE 3,508,726

MEMBERS SUBJECTED TO AN AIRFLOW

Filed Nov. 13, 1967 5 Sheets-Sheet 3

United States Patent Office 3,508,726
Patented Apr. 28, 1970

3,508,726

MEMBERS SUBJECTED TO AN AIRFLOW

Pierre Marcel Lemoigne, 103 Avenue Verdier, Montrouge 92, France

Filed Nov. 13, 1967, Ser. No. 682,228
Claims priority, application France, Nov. 18, 1966, 84,096
Int. Cl. B64c *21/02;* B64d *17/14;* B63h *9/04*
U.S. Cl. 244—42 6 Claims

ABSTRACT OF THE DISCLOSURE

The invention provides an improved member such as an aircraft wing, the sail of a ship or a parachute canopy having a passage of varying cross-section extending through it to improve airflow characteristics.

This invention relates to improving the airflow over members subject to an air stream. Examples of such members are the lift surfaces of aircraft, the canopies of parachutes, the aerofoils of flying devices and the sails of ships.

It is a main object of this invention to provide high-lift means for accelerating the airflow and modifying the direction thereof, if required with control of airflow volume and direction.

When the invention is used in association with ships' sails, the efficiency thereof is improved by the flow-accelerating facilities, the high-lift effect being replaced by an increase in the traction resultant and/or by a modification in the direction thereof. The invention is intended for use with rigid and semi-rigid surfaces as well as with flexible surfaces.

According to a known suggestion for improving airflow the passages connect the side of the member which is leading with respect to the airflow to the side of the member which is trailing with respect to the airflow.

According to the invention a passage is provided through the member the cross-section of the passage varying in the direction of the airflow, several cross-sectional variations possibly occurring, thus the cross-sectional area of the passage can increase, then decrease, along the length of the passage. Consequently, by devising the constituent parts of a nozzle defining the passage appropriately a passage can be provided which is convergent-divergent or which has any other special feature to suit the function.

The invention will be better understood from the following detailed description and accompanying drawings which show various exemplary non-limitative embodiments of the invention and in which.

Figure 1:
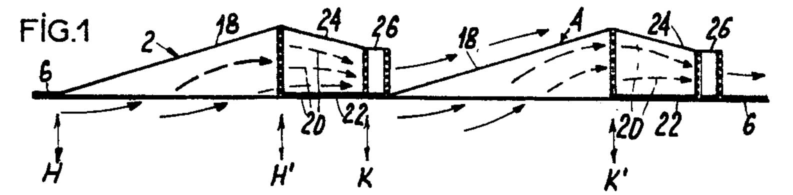
FIGURES 1 and 2 are views, in side elevation and plan respectively, of two accelerating nozzles according to the invention.
Figure 2:
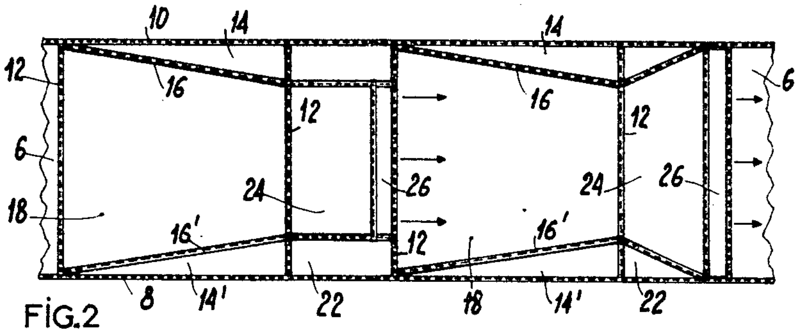
Figure 3:
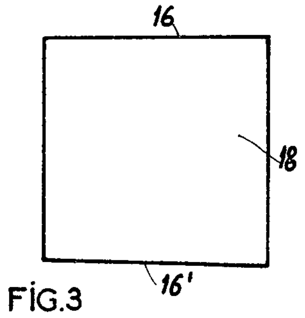
FIGURES 3–8 are developed plan views of cloth elements used for the nozzles shown in FIGURES 1 and 2.

FIGURES 1 and 2 show two embodiments of variable cross-section nozzles 2, 4. Nozzles of this kind are mounted, for example, on one of gores 6 of a parachute or on one of the cloths of a ship's sail. The cloth gore 6 can of course in shape resemble an elongated triangle, but it can also have its edges 8, 10 parallel or substantially parallel to one another, in the manner shown in FIGURE 2.

Figure 6:
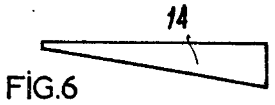
Figure 7:
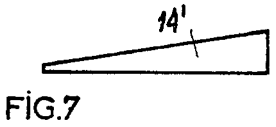

The gore 6 is interrupted between the levels H and H′ to form the entry of the nozzle 2 and between the levels K and K′ to form the entry of the nozzle 4. At the levels H–H′ and K–K′ the apertures are edged by reinforcing tapes or the like 12 and the nozzle entry apertures are given a trapezoidal shape in plan by triangular cloth elements 14, 14′, shown in FIGURES 2, 6 and 7, being sewn on, each such element having secured to its hypotenuse edges 16, 16′ of rectangular cloth panels 18 which form the main portions of the nozzles 2, 4.

The conventional accelerating nozzles, interalia for parachute canopies, are merely a single cloth panel which is in shape rectangular or trapezoidal and to which the airflow imparts a substantially trunco-conical shape. The airflow therefore leaves the nozzle exit in a direction which may vary appreciably from the tangent to the bearing or lift surface; consequently, depending upon the job that the nozzle is required to do, for instance, to provide a propulsive component, nozzle efficiency is reduced considerably.

Figure 4:
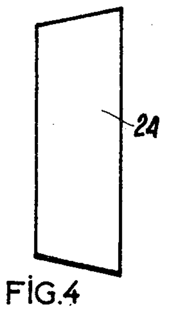
Figure 5:
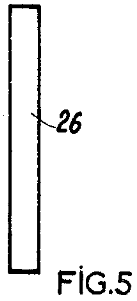
Figure 8:
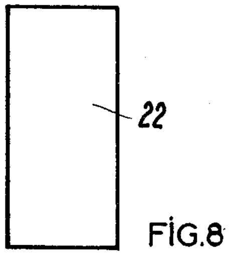
Figure 15:
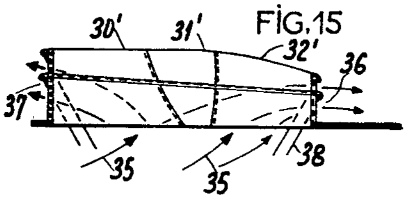
FIGURES 15 and 16 are views, in side elevation and plan respectively, of a double-flow balloon nozzle according to another embodiment of the invention.

In a nozzle according to the invention, the airflow is channelled (see arrows 20 in FIGURE 1) into a second portion of the nozzle between the imperforate part 22 of the panel, the part 22 forming the "base" of the nozzle (FIGURES 1, 2 and 8), and a convergent or divergent trunco-conical or cylindrical cloth element 24 in the form of a cloth panel, an example of which is shown in FIGURE 4 and which is sewn to the free edge of the panel 18 and laterally to the nozzle "base" 22. This deflecting element 24 can be extended by an element 26 (FIG- URES 1, 2 and 5) which has a constant flow cross-section and which forms the actual nozzle exit or outlet. Consequently, the air flowing from the back (underside) to the front (top side) of the aerofoil or sail or canopy or the like is deflected by the double-curved nozzle and can depart therefrom substantially tangentially to the surface 6 of the aerofoil or the like (case of the nozzle 4) or to the surface 18 of the next nozzle (case of FIGURE 2).

Since a nozzle according to the invention in which the cross-section varies over the whole length of the nozzle channels and directs the air thoroughly, a very considerable real acceleration of the airflow is produced and each nozzle can be adapted to the particular purposes for which it is required. For instance, in the case shown in FIGURES 1 and 2, the nozzle 4, which is formed with a flared aperture 24 extending over the whole width of the gore 6, makes a very good end nozzle, for example, for an aircraft aerofoil in which the flow from the underside to the top side of the aerofoil is wholly or partly produced, depending upon the aircraft attitude, by the suction produced by the driving screw disposed to the rear of the nozzle.

Of course, FIGURES 1 and 2 show two nozzles of different kinds disposed immediately next to one another, but each such nozzle can be provided on its own, or a sequence of identical nozzles can be provided.

FIGURES 9–14 are similar views of another form of nozzle which can be called a "double-curved highlift balloon type nozzle." The gore 6 of a parachute canopy is interrupted between the levels L and L′ to leave a nozzle entry aperture, rear portion 24 of the nozzle being closed at the bottom by a "base" 22 which is merely the extension of the gore 6. The main body 28 of the nozzle comprises three cloth panels 30, 31, 32, the first and last of which are simply trapezoidal when seen in plan and have their edges sewn to the nozzle aperture edges, whereas the intermediate element 31 is in shape lenticular and has its rounded edges sewn to the major bases of the trapezoidal panels 30, 32. The resulting nozzle has an evolving curved shape which provides a lift action similar to the lift action of a hollow wing, the stability of the resulting aerodynamic system being further improved by the divergent outlet 24 of the nozzle, such outlet behaving similarly to the reflexed trailing edge of a stable aerodynamic profile. The propulsive effect provided by the accelerated airflow 33 at the outlet of the nozzle 28 is further increased by the forwards component 34 (acting towards the left in FIGURE 9) of the air pressure, such component acting on the forward curved part 30 of the nozzle 28.

The embodiment of a nozzle shown in FIGURES 15–18 is similar to the embodiment shown in FIGURES 9–14 except that the nozzle in FIGURES 15–18 is a double-flow nozzle, i.e., it is formed with a single inlet orifice for air streams 35 from the underside, and with two oppositely disposed outlet orifices 36, 37 which preferably have different cross-sections from one another. As in the previous case, the nozzle is formed by two trapezoidal end panels 30′, 32′, being assembled with a lenticular intermediate panel 31′, so that the nozzle takes up the balloon shape previously described. In the position shown in FIGURE 15, a double airflow leaves the nozzle through the two opposite orifices 36, 37, although these oppositely directed flows can, in dependence upon the volumes and speeds of the respective flows, provide a propulsive component in a particularly direction.

Figure 17:
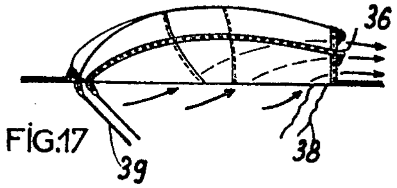
FIGURES 17 and 18 show the flow reversal which the nozzle shown in FIGURES 15 and 16 can provide.
Figure 18:
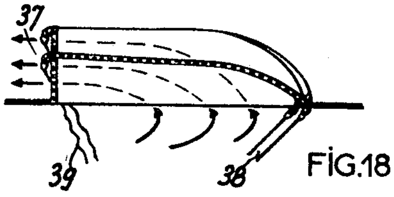

The outlet orifices 36, 37 are associated with control facilities, such as shrouds 38, 39, for selectively closing either the orifice 36, as in FIGURE 18, or the orifice 37, as in FIGURE 17. The airflow direction can therefore be reversed and a propulsive effect or a braking effect can be obtained at choice, or else, when both orifices are open, a simple venting effect is provided.

Figure 19:
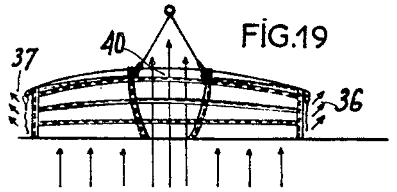
FIGURES 19 and 20 are two views of an alternative form of double-flow nozzle with a central outlet.
Figure 20:
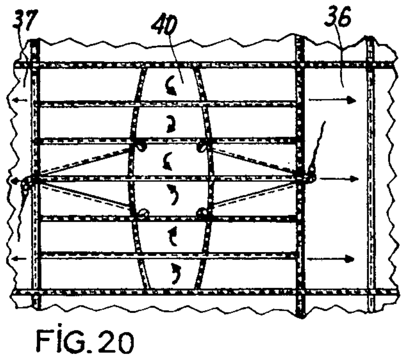

The alternative form of double-flow nozzles shown in FIGURES 19 and 20 is formed not only with outlet orifices 36, 37 as in the embodiment shown in FIGURES 15–18, but also with a central outlet orifice 40 whose opening can be controlled by means of shrouds or the like; a controlled-flow nozzle of this kind can be used as a central orifice or chimney in the aerofoil of a flying device or in a parachute canopy.

Figures 9, 10:
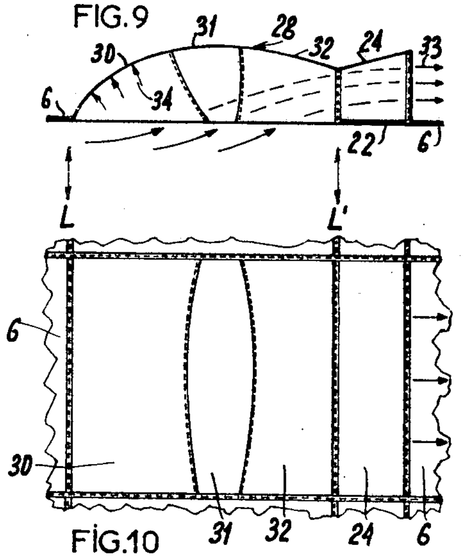
FIGURES 9 and 10 are views, in side elevation and plan respectively, of a double-curved balloon type high-lift nozzle according to the invention.
Figure 16:
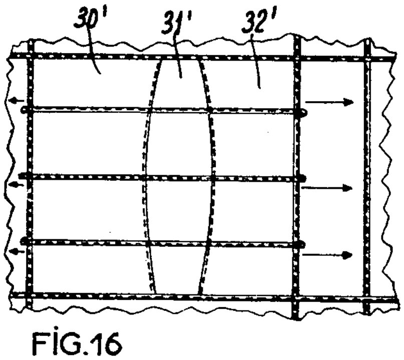
Figure 11:
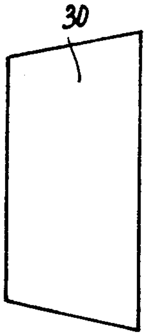
FIGURES 11–14 are developed plan views of the cloth panels used for the nozzle shown in FIGURES 9 and 10.
Figure 12:
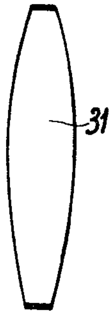
Figure 13:
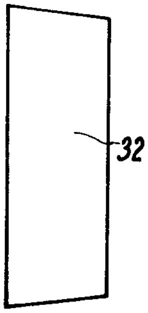
Figure 14:
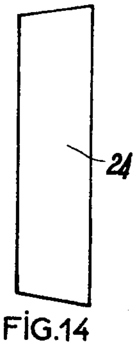
Figure 21:
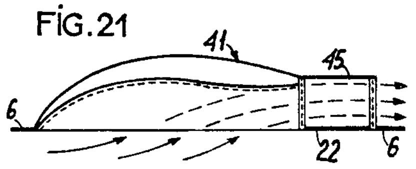
FIGURES 21 and 22 show another embodiment of a balloon type high-lift nozzle of the kind shown in FIGURES 9 and 10.
Figure 22:
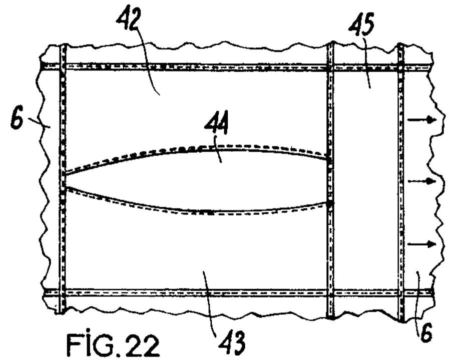

FIGURES 21 and 22 are views, in side elevation and plan respectively, of a balloon nozzle 41 whose main part comprises, as in the case shown in FIGURES 9 and 10, two substantially trapezoidal panels 42, 43 assembled to an intermediate panel 44 of lenticular shape; however, the panel 44, instead of being arranged transversely as in FIGURES 9 and 10, is arranged longitudinally in relation to the nozzle. By way of example, the main part of the nozzle 41 is shown in FIGURES 21 and 22 as being extended by an outlet passage 45 of constant cross-section and bounded by a top strip of cloth, to which the airflow imparts a substantially cylindrical shape, and by the "base" 22 which is formed by an extension of the gore 6.

A description has been given in the foregoing of controllable-acceleration and rate-of-flow high-lift facilities, some of which are reversible in the case of flexible aerofoils or the like, inter alia in the case of parachute canopies and aerofoils for flying devices. However, and as can be seen in FIGURES 23–31, these high-lift facilities formed by special nozzles of variable cross-section and shape are also of use for rigid aerofoils or the like.

The bearing or lift surface shown in FIGURES 23–31 is a surface having a thick aerodynamic profile which is maintained by a rigid structure 46–47. The underside of the lift surface is pierced with apertures 48, 48′, 48″ and the top side is pierced with apertures 49, 49′, 49″ (FIGURES 23, 29 and 30) which respectively intercommunicate by way of the decreasing cross-section passage 50, 50′, 50″ bounded by aerodynamically shaped partitions 51, 51′, 51″. The same can just be formed by a flexible panel, for instance, of cloth which is retained on the support skeleton by means of lacing. The top-side part 52 near the leading edge can also be formed by a similar cloth panel, as can be seen in detail in FIGURE 24.

The effect of the variable cross-section nozzles is that the flow of air from the underside to the top side of the aerofoil is accelerated and directed at its exit substantially parallel to the top side, with the result of a very considerable high-lift effect and increase in the lift, particularly at high angles of attack, so that the risk of flow detachment is delayed or even completely obviated.

In a lift surface of this kind the airflow over the leading edge is preferably improved and controlled by means of a safety reflex 53 which forms, between its underside and the top side of the leading edge of the lift surface, a first accelerating nozzle 54 supplying the curved portion of the leading edge to prevent any detachment of the air stream lines. The member 53 is adapted to pivot around a spindle 55 and its orientation can be controlled by means of linkage 56 operated by actuating means which are not shown. The cross-section of the nozzle 54 can therefore be controlled as required (FIGURES 23 and 26), and the member 53 can even be pointed downwards (FIGURE 27) so as to form an aerodynamic brake in some flight attitudes.

Figure 28:
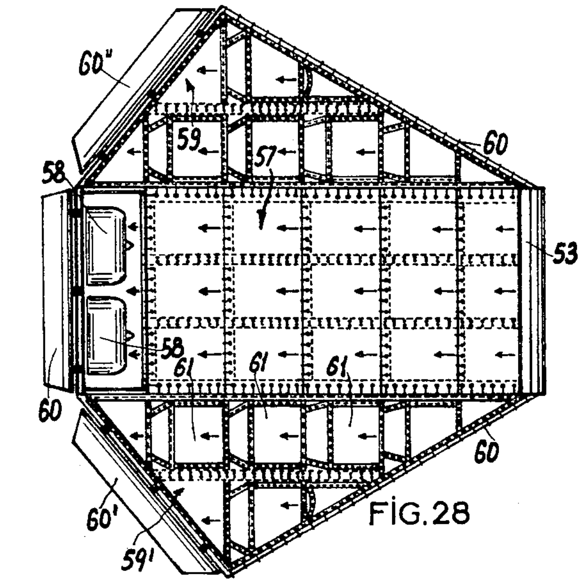
FIGURE 28 is a plan view of an aircraft, some of whose lift surface is embodied in accordance with FIGURES 23–25.

A rigid lift surface comprising nozzles, such as the one just described with reference to FIGURES 23 to 27, can be used with advantage for an aircraft such as is diagrammatically shown in FIGURE 28. The aerofoil of such aircraft can be a substantially rectangular rigid central portion 57 identical to the corresponding portion shown in FIGURE 23 and comprising, e.g., along its length five nozzle rows which are preceded by the nozzle formed by the safety reflex 53 and the leading edge of the profile. Transversely, and to facilitate the arrangement of the bearing structure for the profile, each nozzle can be formed by the juxtaposition of three elementary nozzles. Propulsive means, such as two faired screws 58 driven by motors (not shown), can be disposed after this portion of the aerofoil. This rigid central lift surface can be supplemented by two flexible lateral surfaces 59, 59′, for instance, of cloth stretched over a peripheral frame 60. Preferably, the two lateral surfaces 59, 59′ have an appreciable dihedral angle relatively to the central surface to ensure stability of the craft. A conventional elevator 60 and conventional ailerons 60′, 60″ are disposed at the trailing edge of the three portions of the aerofoil.

Advantageously, the lateral lift surfaces 59, 59′ have nozzles 61 similar to the nozzles described with reference to FIGURES 1–10. For overland transportation the lateral lift surfaces can be folded onto the central part of the aerofoil, so that the overall width of the device is reduced and, in the case of a lightweight device, road transportation without exceeding permissible limits is possible.

Figure 23:
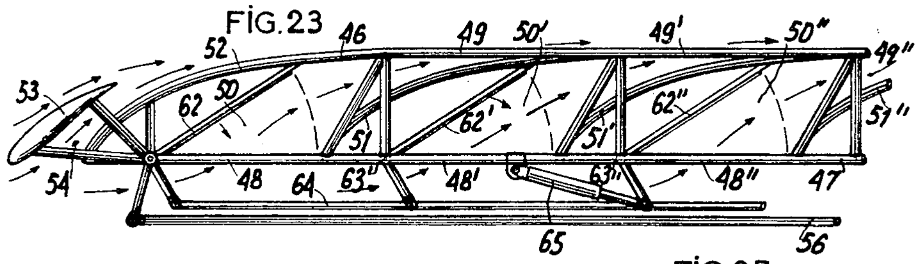
FIGURES 23–25 are views, in longitudinal section, plan and cross-section respectively, of a rigid bearing surface having controllable acceleration and rate-of-flow high-lift facilities according to the invention.
Figure 24:
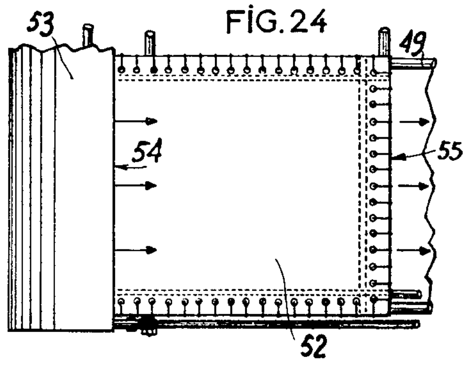
Figure 25:
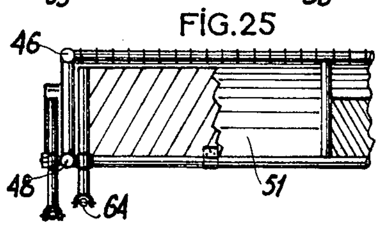
Figure 26:
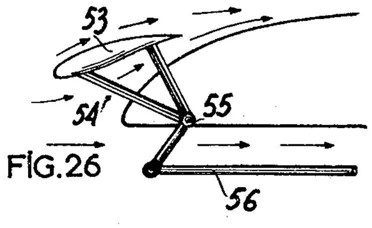
FIGURES 26 and 27 are partial views of the bearing or lift surface shown in FIGURE 23, with one of the high-lift facilities shown in one position in FIGURE 26 and in a different position in FIGURE 27.
Figure 27:
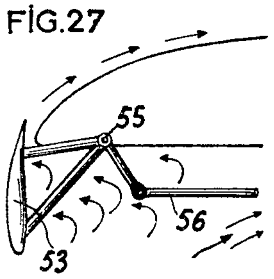

The high-lift accelerating nozzles 50, 50′, 50″ of the rigid central portion of the lift surface are useful inter alia in slow flight and in a nose-up attitude. For high-speed flight at a low angle of attack, closure means are provided which shut the nozzles and restore the entire top side to an imperforate state. This is the function of the pivoted panels 62, 62′ and so on which can be seen in FIGURES 23, 29, 30 and 31 and which are adapted to close the nozzle entry orifices 48, 48′. The last-mentioned panels can pivot around spindles 63, 63′ and so on and can be opened and closed simultaneously, for instance, through the agency of linkage 64 operated by an actuator such as a ram or jack 65 (FIGURE 23). The aerofoil can therefore be given at choice either highlift properties (opening of the moving panels (FIGURE 23)) or properties suitable for high-speed flight at a low angle of attack (closure of the moving panels (FIGURE 30)). In this latter attitude the outlet apertures 49, 49′, etc., of the top side of the areofoil can readily stay open since they do not disturb the flow of the air stream lines 66 over the top of the profile.

Figure 31:
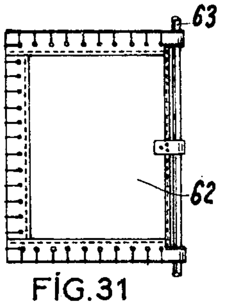
FIGURES 29–31 are diagrammatic views in which the moving members of the lift surface shown in FIGURE 23 are shown in different positions and in which the airflow is shown in the various cases.
Figure 30:
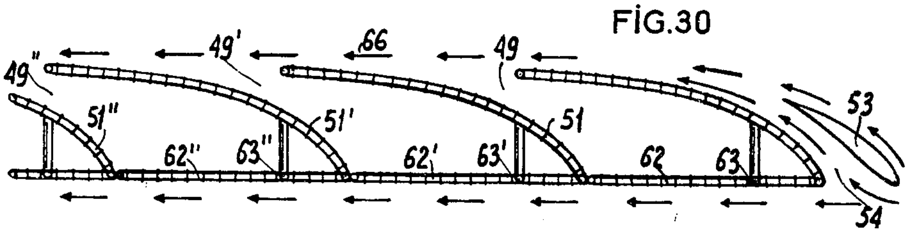

As shown in FIGURE 31, the moving panels 62, 62′, 62″ can be formed by a cloth element stretched over a rigid frame.

Figure 32:
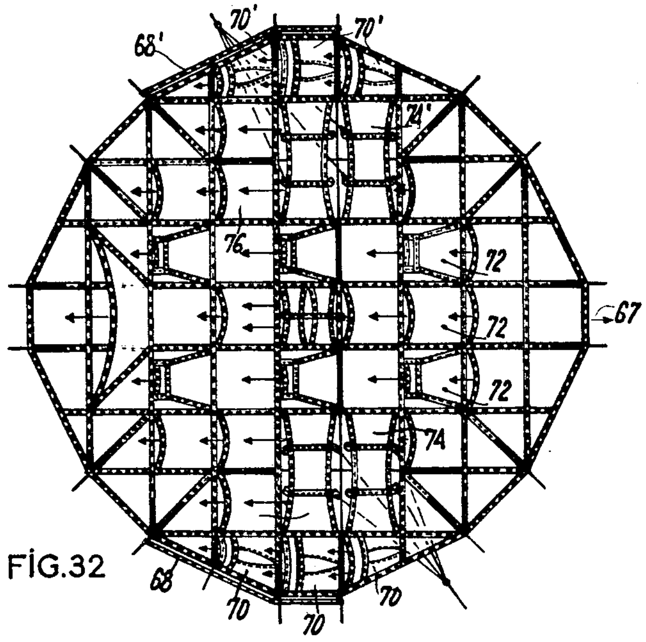
FIGURE 32 is a plan view of a flying device having a flexible aerofoil comprising high-lift accelerating nozzles according to the invention.

FIGURE 32 shows the aerofoil or bearing surface of a flying device such as a gliding parachute (drift parachute) or a precision-landing parachute, having controllable acceleration and rate-of-flow high-lift facilities, some of which are reversible in accordance with the invention. Preferably, an aerofoil or the like of this kind has a low aspect ratio, for instance, near unity in the case shown in FIGURE 32. The device moves in the direction indicated by an arrow 67. Preferably, the aerofoil is formed by an assembly of parallel-edged gores and not, as has previously been conventional, by an assembly of substantially triangular radial gores. The parallel-edged gores assembly is simpler, cheaper and stronger than the conventional construction. The aerofoil has two lateral stabilising elements 68, 68′ in the form of cloth panels disposed between lines connecting the aerofoil to the load or to the pilot, the stabilising panels 68, 68′ being substantially vertical and serving as fins. A number of cloth nozzles are disposed on the cloth gores of the aerofoil.

For instance, nozzles 70, 70′, preferably of the balloon kind as shown in FIGURE 21, can be disposed laterally, for instance, in groups of three. Such nozzles provide a considerable lift which, when acting on the edge portions of the aerofoil, helps to spread the same out, thus increasing the projected surface of the aerofoil and reducing its "sag."

Also, a group of accelerating nozzles 72, for instance, identical to the nozzles shown in FIGURE 1, are disposed on the top part of the aerofoil and have an accelerating effect which increases the sharpness of build of the device. The aerofoil can also have double-flow and outlet nozzles 74, 74′, for instance, similar to the nozzle shown in FIGURE 19 and having control means, such as shrouds, under the pilot's control so that he can open one or the other of the outlet orifices of these nozzles to control the direction and rate of flow of the outlet air and thus control the translational speed and the speed of vertical descent and possibly retard the translational speed. The aerofoil can also comprise a number of conventional accelerating nozzles 76 formed by a plain cloth panel.

Figure 33:
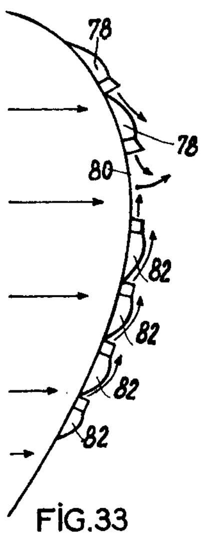
FIGURE 33 is a view in side elevation of a spinnaker type of sail having accelerating nozzles according to the invention.
Figure 29:
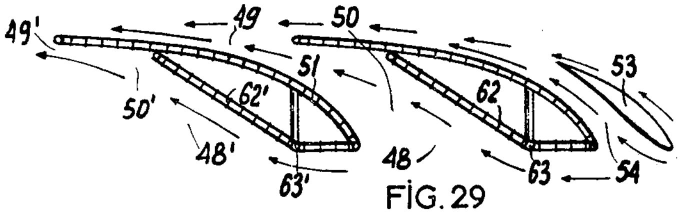

FIGURE 33 is a diagrammatic view showing how the invention can be used with a spinnaker type ship's sail, only the central gore of which is shown. The sail can have at the top a group of nozzles 78 having flared outlet orifices, for instance, similar to the balloon nozzles shown in FIGURE 9. A function of this nozzle group is to supply air to the sail surface remote from the wind and, by virtue of the special shape of the nozzles, to help to raise the top of the spinnaker. Advantageously, a nozzle-free canvas strip 80 is left below the nozzle group 78, and another nozzle group 82 in the bottom part of the sail blows towards the strip 80; the nozzles of the group 82 can be, for instance, similar to the nozzle shown in FIGURE 21. Of course, other cloths of the sail can have other nozzles, some serving to produce a lateral reaction on the sail to help spread the same out, so that the spinnakers can be cut much less hollow than has conventionally been done, i.e., they can have a useful projected area little less than the actual canvas area.

The invention is not of course limited to the embodiments described and shown and can be varied in many ways within the scope of the skilled addressee according to the intended applications and without for that reason departing from the scope of the invention.

I claim:

1. An aerofoil comprising at least one opening for establishing communication between the positive pressure side and the negative pressure side of the aerofoil; and air nozzle means adapted to deflect the air passing from the positive pressure side through the opening to the negative pressure side of the aerofoil, said nozzle means including an air deflecting panel section a free edge of which overlies a corresponding edge portion of the opening so as to form with said edge portion a nozzle throat, and a second panel section connected to said free edge of the deflecting panel section and forming with a surface portion underlying the negative pressure side of the aerofoil a channel adapted to guide the air forced through said throat in a predetermined direction substantially parallel to the plane of said opening.

2. An aerofoil according to claim 1, wherein said guide channel has a uniform cross-section throughout its length.

3. An aerofoil according to claim 1, wherein the cross-section of said guide channel decreases from said nozzle throat to the exit.

4. An aerofoil according to claim 1, wherein the cross-section of said guide channel increases from said nozzle throat to the exit.

5. An aerofoil according to claim 1, wherein said guide channel is prolonged by means of a third panel section connected to said second panel section and forming with said surface portion underlying the negative pressure side of the aerofoil an additional channel length portion of uniform cross-section.

6. An aerofoil as claimed in claim 1, wherein said deflecting panel section is made up of three assembled parts one of which has, prior to assembling, a flat lenticular shape and the two other parts a trapezoidal shape so that after assemblage of said three parts and attachment thereof to said corresponding edge portion of the opening said deflecting panel section is of arcuate longitudinal and arcuate transverse cross-section.

(References on following page)

References Cited

UNITED STATES PATENTS

| | | | |
|---|---|---|---|
| 1,201,182 | 10/1916 | Hermanson | 244—42 |
| 1,918,536 | 7/1933 | Griswold | 244—42 |
| 2,077,070 | 4/1937 | Rose | 244—42 |
| 3,281,095 | 10/1966 | Runge | 244—42 |
| 1,726,118 | 8/1929 | Page | 244—42 |
| 1,864,964 | 1/1932 | Vaile | 244—42 |
| 1,880,967 | 10/1932 | Maxwell | 244—42 |
| 2,511,504 | 1/1950 | Hawkins | 244—42 |
| 3,343,769 | 9/1967 | Basnett | 244—152 |
| 3,099,426 | 7/1963 | Lemoigne | 244—152 X |

MILTON BUCHLER, Primary Examiner

J. L. FORMAN, Assistant Examiner

U.S. Cl. X.R.

114—103; 244—41, 152